United States Patent
Yassa et al.

(10) Patent No.: US 9,767,791 B2
(45) Date of Patent: Sep. 19, 2017

(54) METHOD AND APPARATUS FOR EXEMPLARY SEGMENT CLASSIFICATION

(71) Applicant: SPEECH MORPHING SYSTEMS, INC., San Jose, CA (US)

(72) Inventors: Fathy Yassa, Soquel, CA (US); Ben Reaves, Sunnyvale, CA (US); Nima Ferdosi, San Jose, CA (US)

(73) Assignee: SPEECH MORPHING SYSTEMS, INC., San Jose, CA (US)

( * ) Notice: Subject to any disclaimer, the term of this patent is extended or adjusted under 35 U.S.C. 154(b) by 0 days.

(21) Appl. No.: 15/262,963

(22) Filed: Sep. 12, 2016

(65) Prior Publication Data

US 2016/0379627 A1    Dec. 29, 2016

Related U.S. Application Data

(63) Continuation-in-part of application No. 15/075,786, filed on Mar. 21, 2016, now Pat. No. 9,449,617, which is a continuation of application No. 14/262,668, filed on Apr. 25, 2014, now Pat. No. 9,324,319.

(60) Provisional application No. 61/825,523, filed on May 21, 2013.

(51) Int. Cl.
    *G10L 15/05*      (2013.01)
    *G10L 25/78*      (2013.01)
    *G10L 25/09*      (2013.01)
    *G10L 25/21*      (2013.01)
    *G10L 25/81*      (2013.01)
    *G10L 25/84*      (2013.01)
    *G10L 25/87*      (2013.01)

(52) U.S. Cl.
CPC .............. *G10L 15/05* (2013.01); *G10L 25/78* (2013.01); *G10L 25/09* (2013.01); *G10L 25/21* (2013.01); *G10L 25/81* (2013.01); *G10L 25/84* (2013.01); *G10L 25/87* (2013.01)

(58) Field of Classification Search
CPC ....................................................... G10L 15/05
See application file for complete search history.

(56) References Cited

U.S. PATENT DOCUMENTS

| | | | |
|---|---|---|---|
| 4,388,495 A | 6/1983 | Hitchcock | |
| 5,617,508 A * | 4/1997 | Reaves | ............... G10L 25/78 704/214 |
| 6,629,070 B1 * | 9/2003 | Nagasaki | ............... G10L 25/78 704/233 |
| 2005/0154580 A1 | 7/2005 | Horowitz et al. | |
| 2008/0120102 A1 | 5/2008 | Rao | |
| 2012/0253812 A1 * | 10/2012 | Kalinli | ............... G10L 15/04 704/254 |

\* cited by examiner

*Primary Examiner* — Ibrahim Siddo
(74) *Attorney, Agent, or Firm* — Sughrue Mion, PLLC

(57) ABSTRACT

Method and apparatus for segmenting speech by detecting the pauses between the words and/or phrases, and to determine whether a particular time interval contains speech or non-speech, such as a pause.

1 Claim, 8 Drawing Sheets

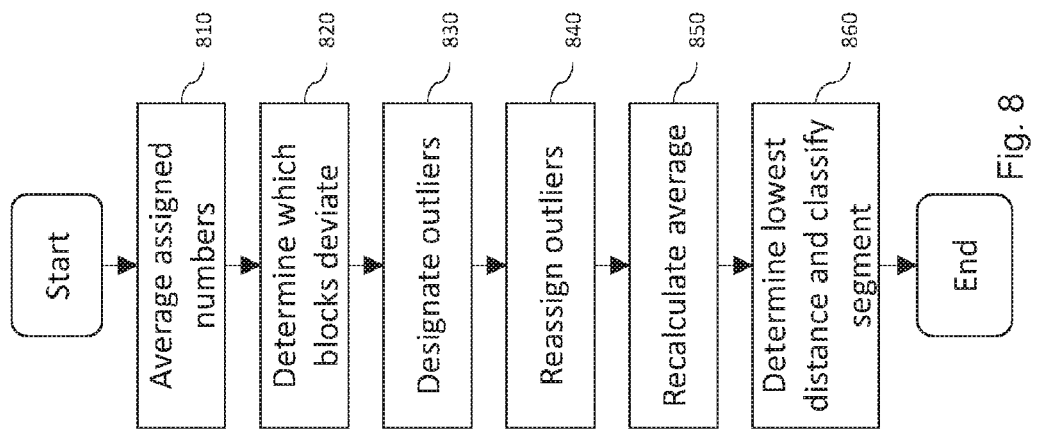

METHOD AND APPARATUS FOR EXEMPLARY SEGMENT CLASSIFICATION

CROSS-REFERENCE TO RELATED PATENT APPLICATION

This application is a Continuation-in-Part of U.S. application Ser. No. 15/075,786 filed Mar. 21, 2016, which is a is a Continuation Application of U.S. application Ser. No. 14/262,668, filed Apr. 25, 2014, which claims the benefit of U.S. Provisional Patent Application No. 61/825,523, filed on Apr. 25, 2013, in the U.S. Patent and Trademark Office, the disclosure of which is incorporated herein by reference in its entirety.

BACKGROUND

1. Field

Speech segmentation is the process of identifying the boundaries between words, syllables, or phonemes in spoken natural language. In all natural languages, the meaning of a complex spoken sentence (which often has never been heard or uttered before) can be understood only by decomposing the complex spoken sentence into smaller lexical segments (roughly, the words of the language), associating a meaning to each segment, and then combining those meanings according to the grammar rules of the language. The recognition of each lexical segment in turn requires its decomposition into a sequence of discrete phonetic segments and mapping each segment to one element of a finite set of elementary sounds (roughly, the phonemes of the language).

For most spoken languages, the boundaries between lexical units are surprisingly difficult to identify. One might expect that the inter-word spaces used by many written languages, like English or Spanish, would correspond to pauses in their spoken version; but that is true only in very slow speech, when the speaker deliberately inserts those pauses. In normal speech, one typically finds many consecutive words being said with no pauses therebetween.

2. Description of Related Art

Voice activity detection (VAD), also known as speech activity detection or speech detection, is a technique used in speech processing in which the presence or absence of human speech is detected. The main uses of VAD are in speech coding and speech recognition. VAD can facilitate speech processing, and can also be used to deactivate some processes during non-speech section of an audio session: VAD can avoid unnecessary coding/transmission of silence packets in Voice over Internet Protocol applications, saving on computation and on network bandwidth.

SUMMARY

Aspects of the exemplary embodiments relate to systems and methods designed to segment speech by detecting the pauses between the words and/or phrases, i.e. to determine whether a particular time interval contains speech or non-speech, e.g. a pause.

BRIEF DESCRIPTION OF THE DRAWINGS

FIG. 8 illustrates a flow diagram of classifying the audio contained within a segment, according an exemplary embodiment.

DETAILED DESCRIPTION OF THE EXEMPLARY EMBODIMENTS

Figure 1:
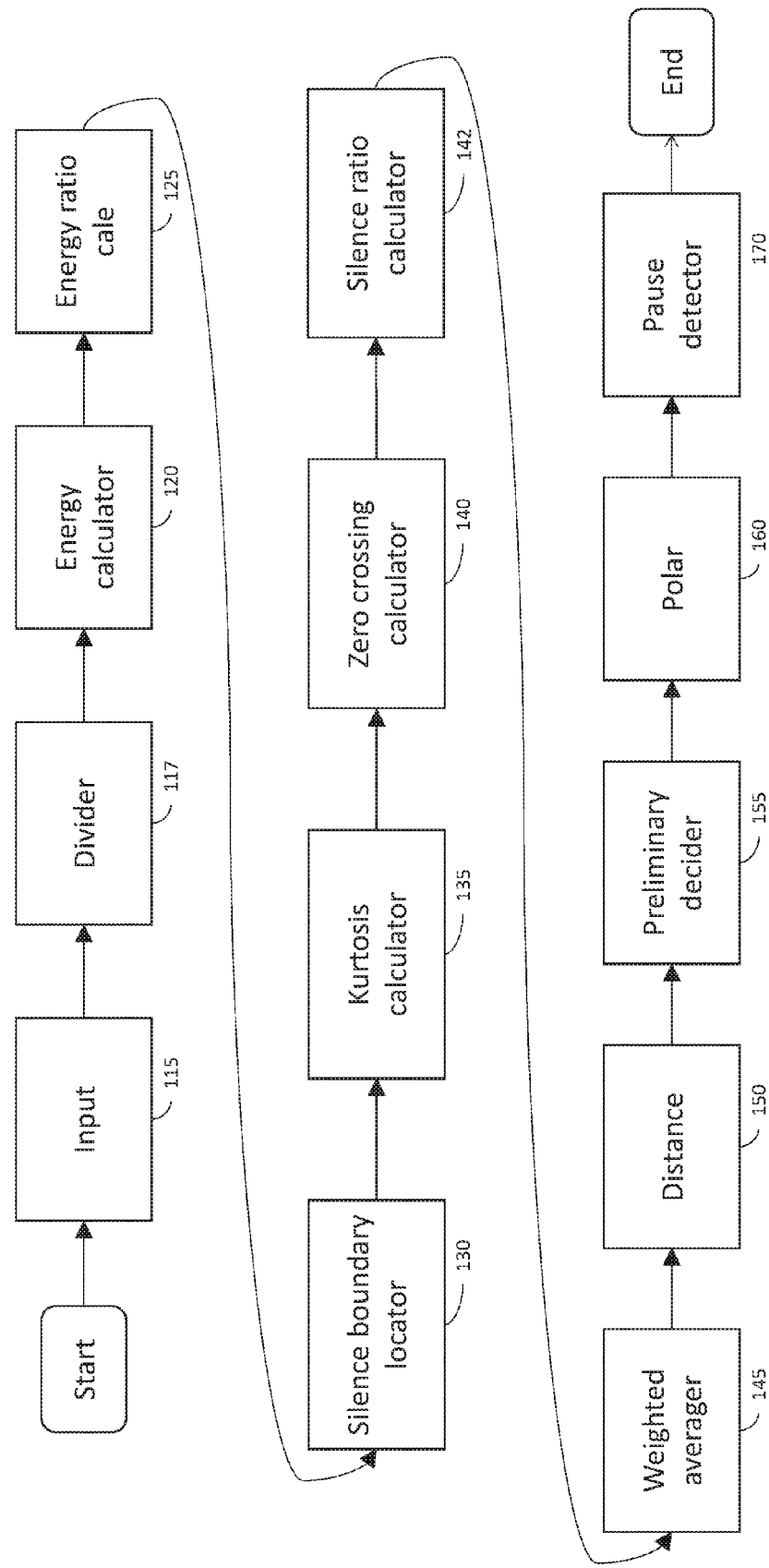
FIG. 1 illustrates a block diagram of a system for classifying input audio, according an exemplary embodiment.

FIG. 1 illustrates a block diagram of a system for classifying input audio according an exemplary embodiment.

The classification system in FIG. 1 may be implemented as a computer system 110, computer system 110 is a computer comprising several modules, i.e. computer components embodied as either software modules, hardware modules, or a combination of software and hardware modules, whether separate or integrated, working together to form an exemplary computer system. The computer components may be implemented as a Field Programmable Gate Array (FPGA) or Application Specific Integrated Circuit (ASIC), which performs certain tasks. A unit or module may advantageously be configured to reside on the addressable storage medium and configured to execute on one or more processors or microprocessors. Thus, a unit or module may include, by way of example, components, such as software components, object oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or modules or further separated into additional components and units or modules.

Input 115 is a module configured to receive input audio from any audio source and output the received audio to the divider 117. The audio source may be live audio, for example received from a microphone; or recorded audio, for example received from a file, etc. The divider 117 is a module configured to receive the output of the input 115 and divide said input audio into blocks, i.e. the blocked audio, of (for example 500) samples. Audio may be silence, speech, music, background/ambient noise or any combination thereof. The energy calculator 120 is a module configured to receive the blocked audio output from the divider 117, calculate the energy of the waveform of the input audio and output the calculated energy of the waveform to the energy ratio calculator 125. The energy ratio calculator 125 is a module configured to calculate the ratio of the energy N1 contiguous blocks of audio over the energy of N2 contiguous blocks of audio contained within the first set of contiguous block of audio and output the energy ratio to the silence boundary locator 130. The silence boundary locator 130 is a module configured to receive the energy ratio calculated by the energy ratio calculator 125, identify the lexical segments between the silence and non-silence portion of the input audio and output the non-silence portions of the input audio to the kurtosis calculator 135.

The kurtosis calculator 135 is a module configured to receive the non-silence audio portions from the silence boundary locator 130, calculate the kurtosis over a sliding window in the non-silence audio portion and identify the transitions between the different types of audio within each non-silence audio portion. The non-silence audio portion between each transition is designated a super segment. Each super segment retains the block divisions from the divider 117. The kurtosis calculator 135 is further configured to calculate the kurtosis for each individual block within a super segment.

The zero crossing calculator 140 is a module configured to receive the block divided super segments from the kurtosis calculator 135 and calculate the number of zero crossings in each individual block with said super segments. A zero-crossing is a point at which the sign of a mathematical function changes (e.g. from positive to negative), represented by a crossing of the axis (zero value) in the graph of the function, and is a commonly used term in electronics, mathematics, sound, and image processing.

The silence ratio calculator 142 is a module configured to receive the block divided super segments from the kurtosis calculator 135 and calculate the silence ratio over each individual block. The silence ratio of an audio segment is the ratio of the samples that are smaller than a given threshold to the length of the block.

The weighted averager 145 is a module configured to create a weighted average of the parameters to create the feature vector of each individual block.

The distance 150 is a module configured to determine, for each block, the Euclidean distance between vectors in n-dimensional space, and in particular between the feature vector for each block and a centroid of pure speech, pure music, pure silence and pure background/ambient noise.

The preliminary decider 155 is a module configured to make a preliminary classification of the audio contained within each block, i.e. whether the block is primarily speech, music or background/ambient noise or silence.

The polar 160 is a module configured to poll the individual blocks within a segment to make a final classification of the audio within said segment.

The pause detector 170 is a module configured to obtain segments, and determine if the segment length is longer than a given threshold and divide the segments into small segments.

Figure 2:
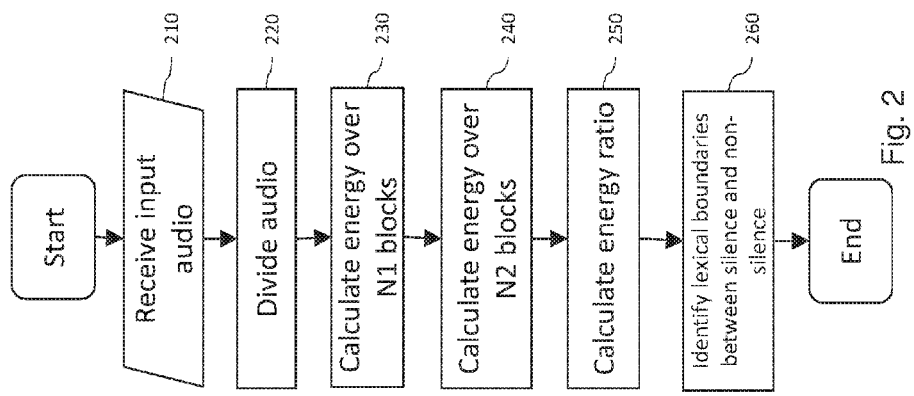
FIG. 2 illustrates a flow diagram of a method of identifying lexical boundaries between silence and non-silence in input audio, according to an exemplary embodiment.

FIG. 2 illustrates a flow diagram of a method of identifying lexical boundaries between silence and non-silence in input audio, according to an exemplary embodiment.

The audio portions between these initial lexical boundaries are designated super segments, which may contain multiple types of audio.

At step 210, the input 120 receives input audio from an audio source. The audio source may be live audio, for example received from a microphone, recorded audio, for example audio recorded in a file, synthesized audio, etc.

At step 220, the divider 117 divides the input audio into blocks of samples, for example 500 samples per block. The length of the blocks is a function of the sample rate.

At step 230, the energy calculator 120 calculates the energy over N1 contiguous blocks. In a preferred embodiment, N1 is 6 blocks.

At step 240, the energy calculator 120 calculates the energy over N2 contiguous blocks where said contiguous blocks are wholly contained within N1 contiguous blocks. In a preferred embodiment, N2 is 4 blocks.

At step 250, the energy ratio calculator 125 calculates the ratio of the energy of the N1 blocks over the energy of the N2 blocks. The energy ratio calculator 125 calculates the energy ratio over a sliding frame.

At step 260, the silence boundary locator 130 identifies the lexical boundaries to and from silence by the energy ratio of the blocks. When there is a transition from silence to non-silence, the moving energy ratio will spike sharply. When there is a transition from non-silence to silence, the moving energy ratio will decline abruptly. The silence boundary locator 130 will assign each super segment a label: silence or non-silence based upon these transitions.

Figure 3:
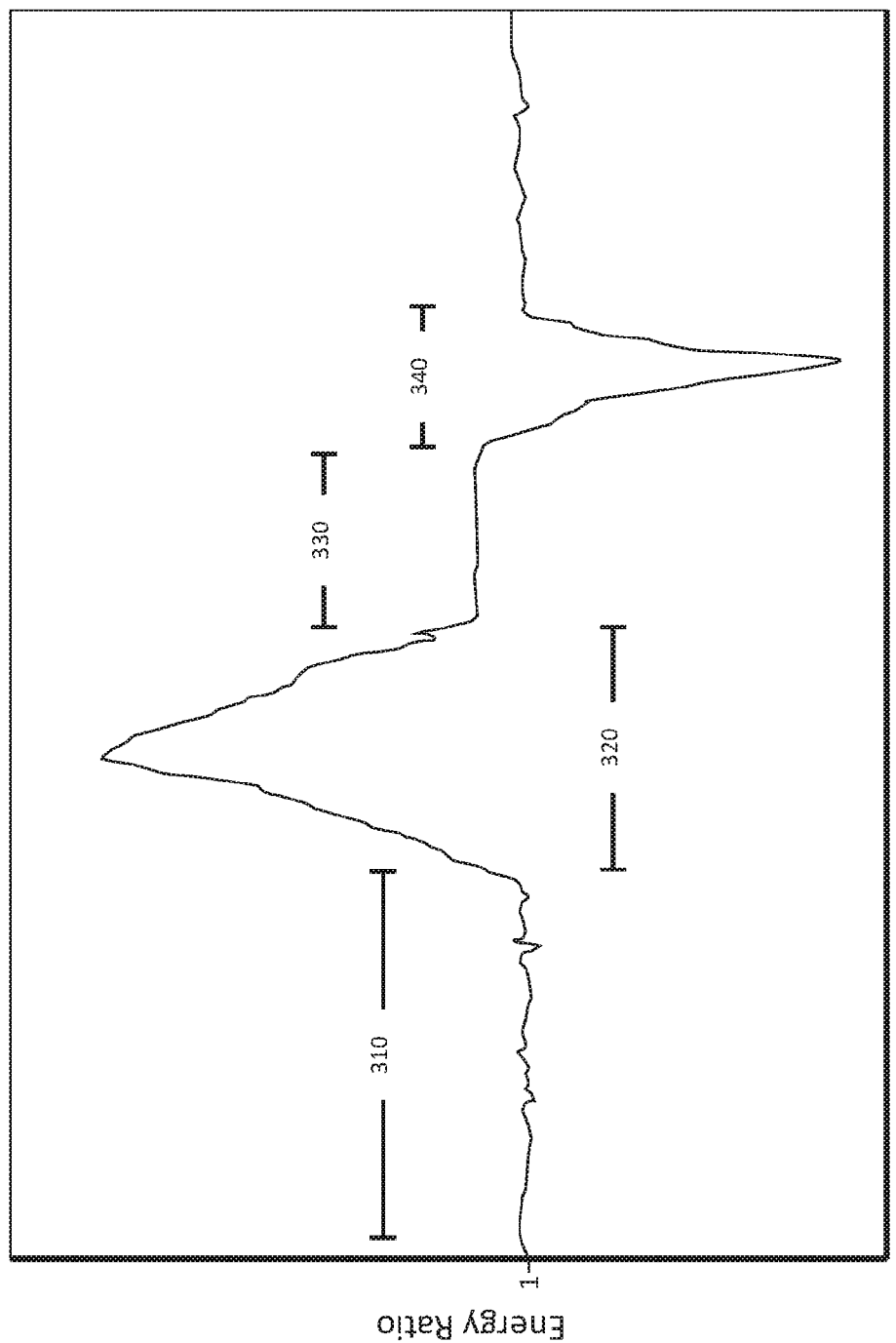
FIG. 3 illustrates a graph of the sliding energy ratio as a function of time, according an exemplary embodiment.

FIG. 3 illustrates a graph of the sliding energy ratio as a function of time.

The time index 310 illustrates a relatively uniform energy ratio of approximately 1, indicating that there is no transition between silence and non-silence within the time index 310.

The time index 320 illustrates a spike in the energy ratio, i.e. the energy ratio is substantially greater than 1. This spike in the energy ratio indicates a transition from non-silence to silence.

Similar to the time index 310, the time index 330 illustrates a uniform energy ratio of approximately 1, once again indicating a lack of transitions between silence to non-silence.

Time index 340 represents a dip in the energy ratio, i.e. the energy ratio is substantially less than 1, indicating transition from silence to non-silence.

Figure 4:
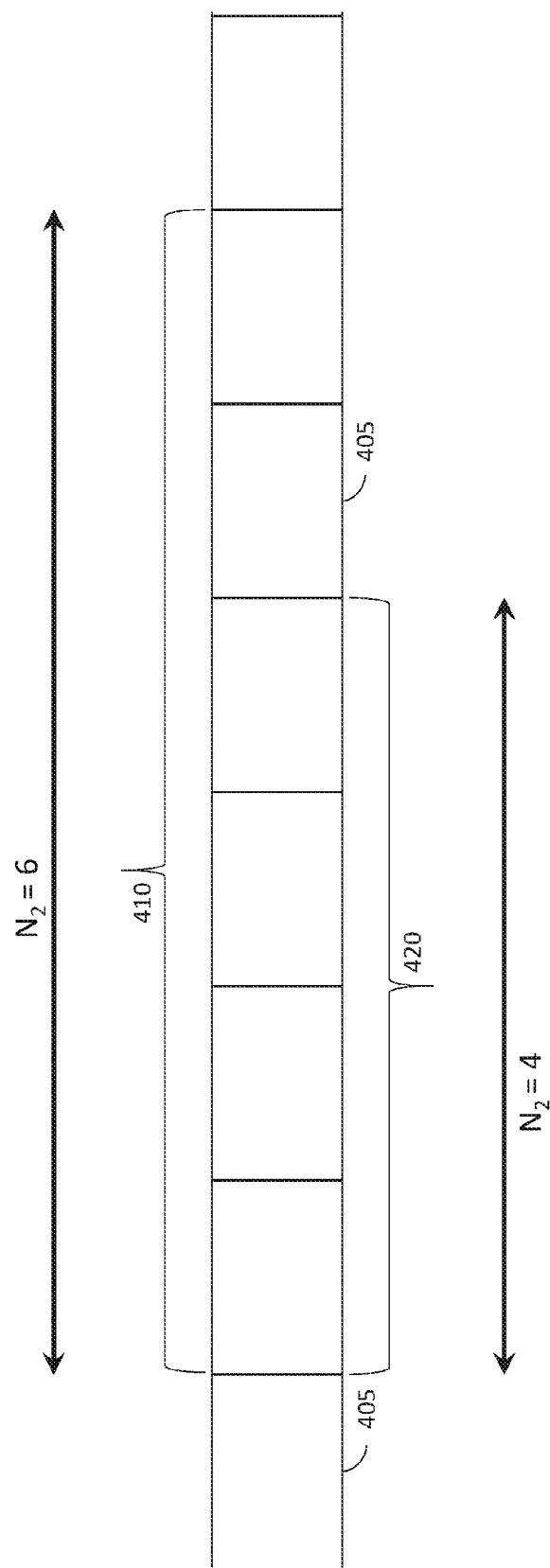
FIG. 4 illustrates a block diagram of the blocks over which energy is calculated, according an exemplary embodiment.

FIG. 4 illustrates a block diagram of the blocks over which energy calculator 120 calculates the energy.

Blocks 405 illustrate the blocks in the input audio. Blocks 410 illustrate the N1 contiguous blocks over which energy calculator first calculates the energy. Blocks 420 illustrate the N2 contiguous blocks over which energy calculator 120 also calculates the energy.

Figure 5:
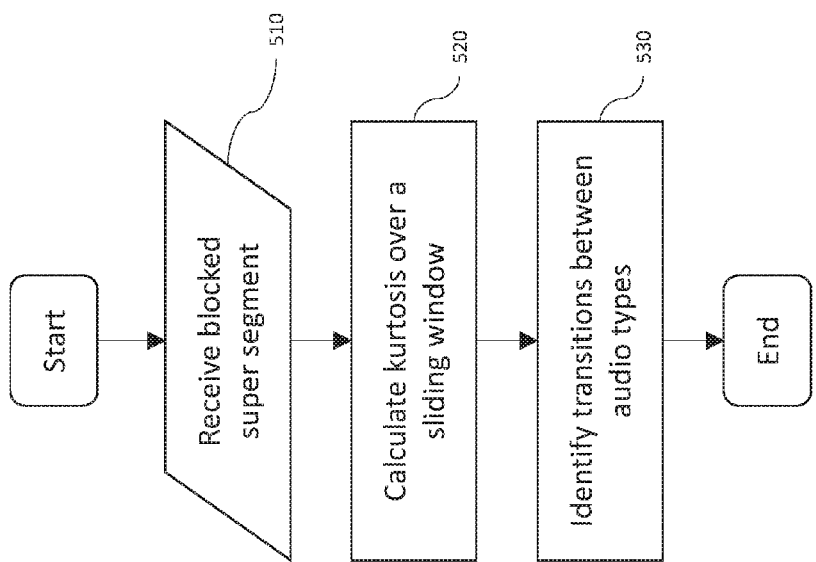
FIG. 5 is a flow diagram of a method of identifying audio transitions within a super segment, according an exemplary embodiment.

FIG. 5 is a flow diagram of the method of identifying audio transitions within a super segment.

At step 510, the kurtosis calculator 135 receives a blocked super segment of non-silence audio.

At step 520, the kurtosis calculator 135 calculates the kurtosis over a sliding window over N3 blocks in the super segment. Calculating kurtosis is within the skill of one schooled in the art of signal processing.

At step 530, the kurtosis calculator 135 identifies the transitions between the different types of audio contained within the N3 blocks of the super segment, i.e. speech, music, and background/ambient noise. A rapid change in the kurtosis over a sliding window of N3 blocks indicates a change in the audio as shown in Table 1.

TABLE 1

| Kurtosis Change | Transition type |
| --- | --- |
| 3 to greater than 30 | Background/ambient noise to speech |
| Greater than 30 to 3 | Speech to background/ambient noise |
| 3 to 10 | Background/ambient noise to music |
| 10 to 3 | Music to background/ambient noise |
| 10 to 30 | Music to Speech |
| 30 to 10 | Speech to Music |

The audio between transitions is designated a segment.

Figure 6:
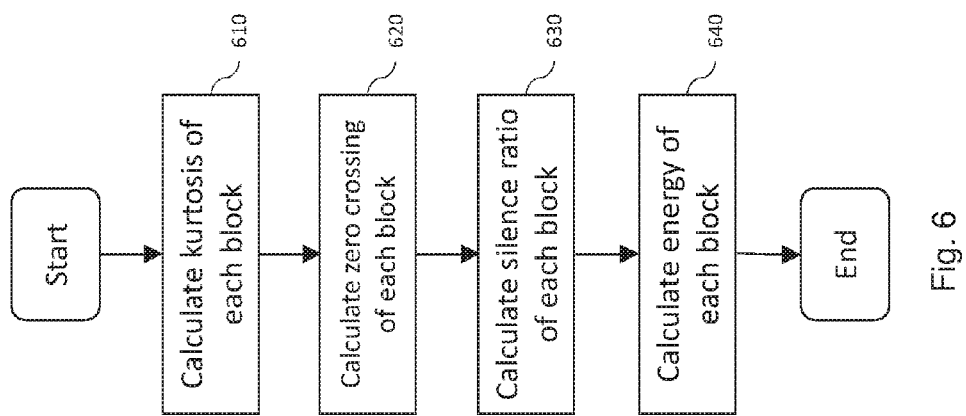
FIG. 6 is a flow diagram of a method of extracting feature vectors for each block, according an exemplary embodiment.

FIG. 6 is a flow diagram of a method of extracting the feature vectors for each block. The feature vectors are used to classify the type of audio contained within each block in the segment.

At step 610 the kurtosis calculator 135 calculates the kurtosis for each individual block within a segment.

At step 620, the zero crossing calculator 140 calculates the zero crossing rate for each individual block. The zero-crossing rate is the rate of sign-changes along a signal, i.e., the rate at which the signal changes from positive to negative or back.

At step 630, the silence ratio calculator 1425 calculates the silence ratio for each individual block. The silence ratio of an audio segment is the ratio of the samples that are smaller than a given threshold to the length of the segment.

At step 640, the energy calculator 120 calculators the energy of each individual block. The four parameters, energy, kurtosis, zero crossing rate and silence ratio, once weighted, will collectively represent the feature vector of a block.

Figure 7:
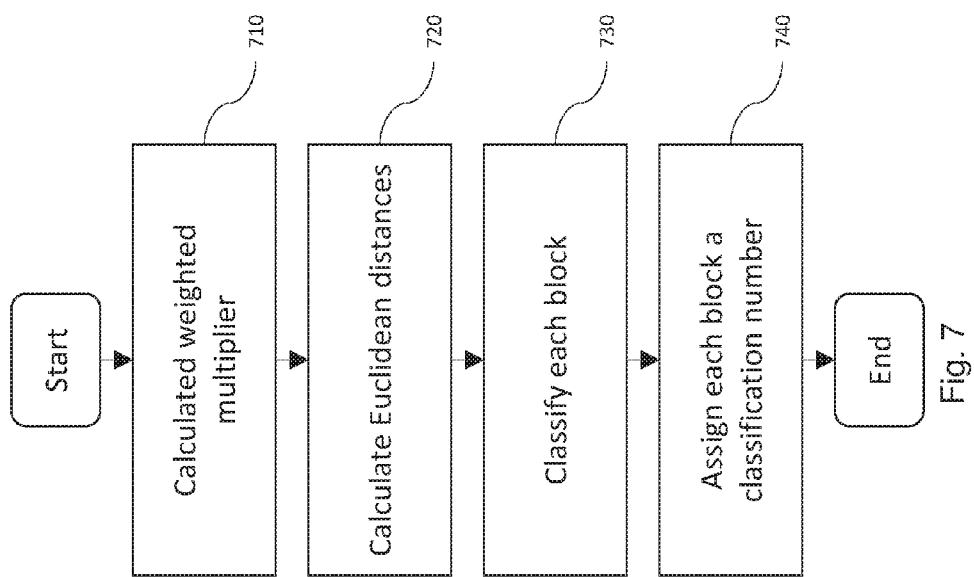
FIG. 7 illustrates a flow diagram of a method of making a preliminary classification of the audio in each block, according an exemplary embodiment.

FIG. 7 illustrates a flow diagram of a method of making a preliminary classification of the audio in each block.

At step 710, the weighted average calculates a multiplication factor, i.e. a weight, to apply to each parameter. In one embodiment, the applied weight is one over one standard deviation of each parameter. The weighted parameters are the elements in the feature vector of each block.

At step 720, for each block, distance 150 calculates the Euclidean distances between the feature vector and a centroid of pure speech, a centroid of pure music, a centroid of pure background/ambient noise, and a centroid of pure silence. Calculating a Euclidean distance is within the ordinary skill of one schooled in the art of signal processing.

At step 730, the preliminary decider 155 classifies the block based upon the centroid with the lowest Euclidean distance from the feature vector, e.g. if a centroid containing music has the lowest Euclidean distance from the feature vector, the segment will be initially classified as music.

At step 740, each block is assigned a value corresponding to its preliminary classification. An example of such values is illustrated in Table 2.

TABLE 2

| Numerical Value | Type of Audio |
|---|---|
| 0 | Silence |
| 1 | Pure speech |
| 2 | Pure music |
| 3 | Background/ambient noise |

FIG. 8 illustrates a flow diagram classifying the audio contained within a segment.

At step 810, the polar 160 averages the assigned numbers of each block within the segment.

At step 820, the polar 160 determines which block classifications deviate by more than a given threshold, e.g. one standard deviation from the average.

At step 830, the blocks whose classification deviate by the more than the given threshold are identified as potentially misclassified, i.e. outliers.

At step 840, the classification of the outliers is reassigned to the current average.

At step 850, the average of all blocks, included the reclassified outliers is recalculated. Alternatively, at step 850, the average is re-calculated with all outliers excluded.

At step 860, the polar 160 determines the difference between the recalculated average and each of the assigned audio values in Table 2. The segment is classified according to the audio with the lowest difference to the recalculated average.

What is claimed is:

1. A system configured to identify a lexical segment in speech, the system comprising:
   an input interface configured to receive an input of audio;
   a divider module configured to divide the input of audio into blocks;
   an energy calculation module configured to calculate energy of the audio over a first and second time intervals of the audio;
   an energy ratio calculation module configured to calculate the ratio of the energy in the first time intervals of the audio over every second time interval within the first time intervals that slides as the energy calculation module calculates the energy of the audio at each of the first time intervals;
   a silence boundary locator module configured to determine transitions between silence and non-silence according to the ratio of the energy calculated by the energy ratio calculation module;
   a first kurtosis calculation module configured to calculate the kurtosis of the audio signal over a third time interval that slides as the kurtosis calculation module calculates the kurtosis of the audio at each of the third time intervals;
   a segment classification module configured to classify the audio in every third time interval according to the kurtosis of the input audio within each third time interval;
   a second kurtosis calculation module configured to calculate kurtosis of the input audio over each fourth time interval that slides as the second kurtosis calculation module calculates the kurtosis of the audio at each fourth time interval;
   a zero cross calculation module configured to calculate zero crossings of the audio within a fourth time interval;
   a silence ratio calculation module configured to calculate the silence ratio of audio with a fourth time interval;
   an individual block calculation module configured to classify the audio within a fourth time interval according to the second kurtosis calculation module, the zero crossing calculation module, the silence ratio calculation module, and the energy of the fourth time interval;
   a weighted average calculation module configured to calculate the weighted average of the kurtosis, zero cross rate, silence ratio and energy over the fourth time interval;
   a preliminary decision module configured to make a preliminary classification of the audio within the segment; and
   a polling module configured to make a final classification of the audio within the segment.

* * * * *